(12) United States Patent
Irvine

(10) Patent No.: US 11,346,497 B2
(45) Date of Patent: May 31, 2022

(54) GREASE GUN EXTENSION DEVICE

(71) Applicant: Christopher Rixon Irvine, Mokena, IL (US)

(72) Inventor: Christopher Rixon Irvine, Mokena, IL (US)

( * ) Notice: Subject to any disclaimer, the term of this patent is extended or adjusted under 35 U.S.C. 154(b) by 63 days.

(21) Appl. No.: 17/020,719

(22) Filed: Sep. 14, 2020

(65) Prior Publication Data
US 2022/0082208 A1 Mar. 17, 2022

(51) Int. Cl.
*F16N 3/12* (2006.01)
*B67D 7/84* (2010.01)
*B67D 7/00* (2010.01)

(52) U.S. Cl.
CPC .............. *F16N 3/12* (2013.01); *B67D 7/002* (2013.01); *B67D 7/84* (2013.01)

(58) Field of Classification Search
CPC .......... B67D 7/002; B67D 7/04; B67D 99/00; B67D 9/02; F16N 3/12; Y10T 137/8807; Y10T 137/6633; A61M 2209/082
USPC ................................ 222/527, 256, 386, 262
See application file for complete search history.

(56) References Cited

U.S. PATENT DOCUMENTS

| | | | | |
|---|---|---|---|---|
| 2,176,295 A | * | 10/1939 | Creveling | F16N 21/04 141/383 |
| 2,326,415 A | * | 8/1943 | Titus | B67D 7/04 141/41 |
| 2,578,036 A | * | 12/1951 | Berke | B64F 1/28 222/536 |
| 2,986,364 A | * | 5/1961 | Vestal | B67D 7/04 248/75 |
| 3,678,972 A | * | 7/1972 | Swindler | B67D 7/002 141/387 |
| 3,786,837 A | * | 1/1974 | Pipkins | F16K 5/10 137/625.32 |
| 4,130,134 A | * | 12/1978 | Castle | B67D 7/002 137/615 |
| 4,371,136 A | * | 2/1983 | Clay | B67D 7/002 141/387 |
| 4,411,290 A | * | 10/1983 | Heath | B67D 7/002 137/615 |
| 4,646,794 A | * | 3/1987 | Padarev | B67D 7/04 141/1 |
| 4,653,554 A | * | 3/1987 | Von Meyerinck | B64F 1/28 137/615 |
| 4,658,873 A | * | 4/1987 | von Meyerinck | B64F 1/28 137/615 |
| 4,658,874 A | * | 4/1987 | von Meyerinck | B64F 1/28 137/615 |

(Continued)

*Primary Examiner* — Paul R Durand
*Assistant Examiner* — Randall A Gruby
(74) *Attorney, Agent, or Firm* — Savantek Patent Services; Ivan E. Rozek

(57) ABSTRACT

A grease gun extension device that supports a flexible grease gun extension tube allowing the user to securely position the grease tip onto a grease fitting without having to use a second hand to force the grease tip onto the grease fitting. A series of rigid elongate tube supporting members are pivotably attached via spring biased locking knobs and radial gear tooth panels located at the ends of each rigid tube supporting member, allowing the user push on the locking knob, bend the flexible extension tube to the desired angle and release the locking knob to have the radial gear tooth panel sets lock the flexible tube at a fixed angle.

3 Claims, 14 Drawing Sheets

(56) References Cited

U.S. PATENT DOCUMENTS

| | | | | |
|---|---|---|---|---|
| 7,584,871 | B2* | 9/2009 | Huang | F16N 3/12 |
| | | | | 184/105.2 |
| 7,729,832 | B2* | 6/2010 | Benckert | E04G 21/04 |
| | | | | 701/49 |
| 7,762,271 | B2* | 7/2010 | Funk | E04G 21/0436 |
| | | | | 137/1 |
| 8,176,938 | B2* | 5/2012 | Queau | B67D 9/00 |
| | | | | 137/615 |
| 9,731,915 | B1* | 8/2017 | Melton | B65G 67/06 |
| 10,422,445 | B2* | 9/2019 | Butcher | A61M 5/1418 |
| 2005/0249616 | A1* | 11/2005 | Huang | F04B 19/027 |
| | | | | 417/415 |
| 2006/0108180 | A1* | 5/2006 | Grach | F16N 3/12 |
| | | | | 184/105.2 |
| 2018/0030966 | A1* | 2/2018 | Wang | F04B 19/22 |

* cited by examiner

GREASE GUN EXTENSION DEVICE

CROSS REFERENCE TO RELATED APPLICATIONS

Not Applicable

STATEMENT REGARDING FEDERALLY SPONSORED RESEARCH OR DEVELOPMENT

Not Applicable

DESCRIPTION OF ATTACHED APPENDIX

Not Applicable

BACKGROUND OF THE INVENTION

This invention relates generally to the field of grease guns and more specifically to a grease gun extension device.

Grease guns are used by those who maintain equipment to add grease to grease fittings located on equipment so that the internal components of the equipment remain properly lubricated which improves the operation of the equipment and extends its life.

Grease guns normally include extension tubes to reach remote grease fittings on a specific piece of equipment. One extension tube is rigid to reach locations that are in a straight-line orientation to the grease gun and one tube is flexible to allow the tube to reach locations that are not in a straight-line orientation to the grease gun.

However, there is a deficiency in the prior technology in that when using the flexible extension tube, the tip of the tube cannot be firmly placed on the grease fitting unless the user physically places his or her hand on the tube tip to hold it in place on the fitting. In some instances, there is not enough room for the user to perform this act, and the flexibility of the extension tube means that the user cannot exert downward force on the tube to facilitate the intimate connection between the tube tip and the grease fitting. It would therefore be beneficial to be able to rigidize the flexible extension tube once it was bent to the ideal angle to reach a grease fitting.

BRIEF SUMMARY OF THE INSTANT INVENTION

The primary object of the invention is to provide a grease gun extension device that allows the user of a grease gun to position a flexible grease gun extension tube to bend to reach the needed location and then to lock the flexible tube into a rigid condition allowing the grease tip to be placed securely on a standard grease fitting without the user having to use a second hand to force the tube tip onto the grease fitting.

Other objects and advantages of the present invention will become apparent from the following descriptions, taken in connection with the accompanying drawings, wherein, by way of illustration and example, an embodiment of the present invention is disclosed.

In accordance with a preferred embodiment of the invention, there is disclosed a grease gun extension device comprising: a series of rigid elongate supporting members, a plurality of spring biased locking knobs, the rigid elongate supporting members each having C-shaped retainers capable of retaining a flexible grease gun extension tube, the rigid elongate supporting members each terminating at one end a radial gear panel, the radial gear panel of one rigid elongate supporting member capable of engaging the radial gear panel of another rigid elongate supporting member, the spring biased knob including a central post that penetrates one the radial gear panel and joins it with a second radial gear panel and acts as a pivot point, the spring of the spring biased knob being a compression spring and being trapped between the opposite side of the radial gear panel and the underside of the spring biased locking knob, the radial gear panel including opposing finger pull flanges, the finger pull flanges allowing a user to dislodge the first radial gear panel from the second radial gear panel and to adjust the angle of one rigid elongate supporting member in relation to an adjacent rigid elongate supporting member, one side of the elongate member series being in close communication with the barrel of a grease gun, the opposite side of the elongate member series being in close communication with the distal end of the flexible grease gun extension tube, and by locking and unlocking the radial gear panels, a user can set a flexible grease gun extension tube in a fixed and selectively bent position.

BRIEF DESCRIPTION OF THE DRAWINGS

The drawings constitute a part of this specification and include exemplary embodiments to the instant invention, which may be embodied in various forms. It is to be understood that in some instances various aspects of the instant embodiments may be shown exaggerated or enlarged to facilitate an understanding of the instant embodiment.

DETAILED DESCRIPTION OF THE PREFERRED EMBODIMENTS

Detailed descriptions of the preferred embodiment are provided herein. It is to be understood, however, that the present invention may be embodied in various forms. Therefore, specific details disclosed herein are not to be interpreted as limiting, but rather as a basis for the claims and as a representative basis for teaching one skilled in the art to employ the present invention in virtually any appropriately detailed system, structure or manner.

Figure 1:
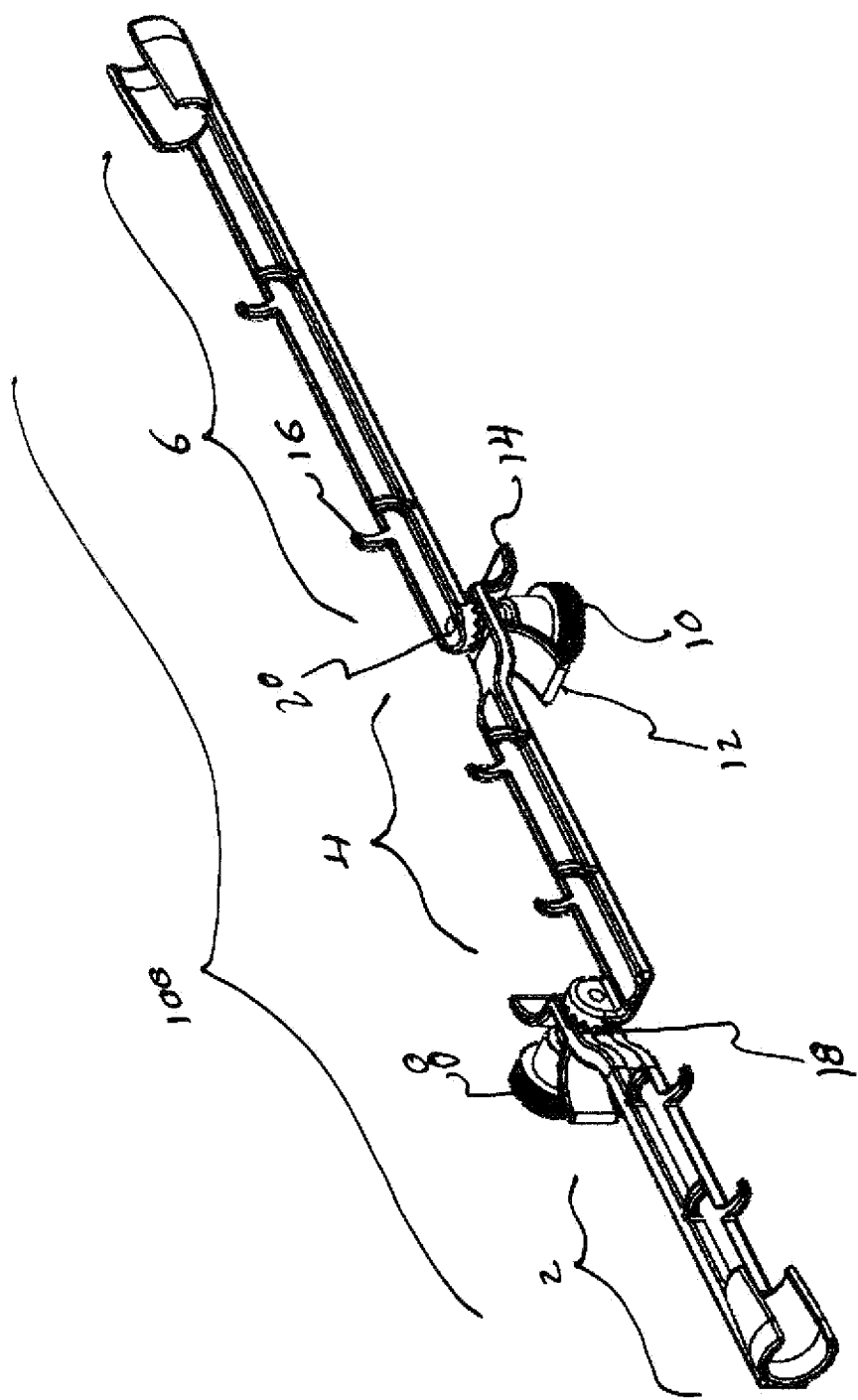
FIG. 1 is a perspective view of the instant embodiment.
Figure 2:
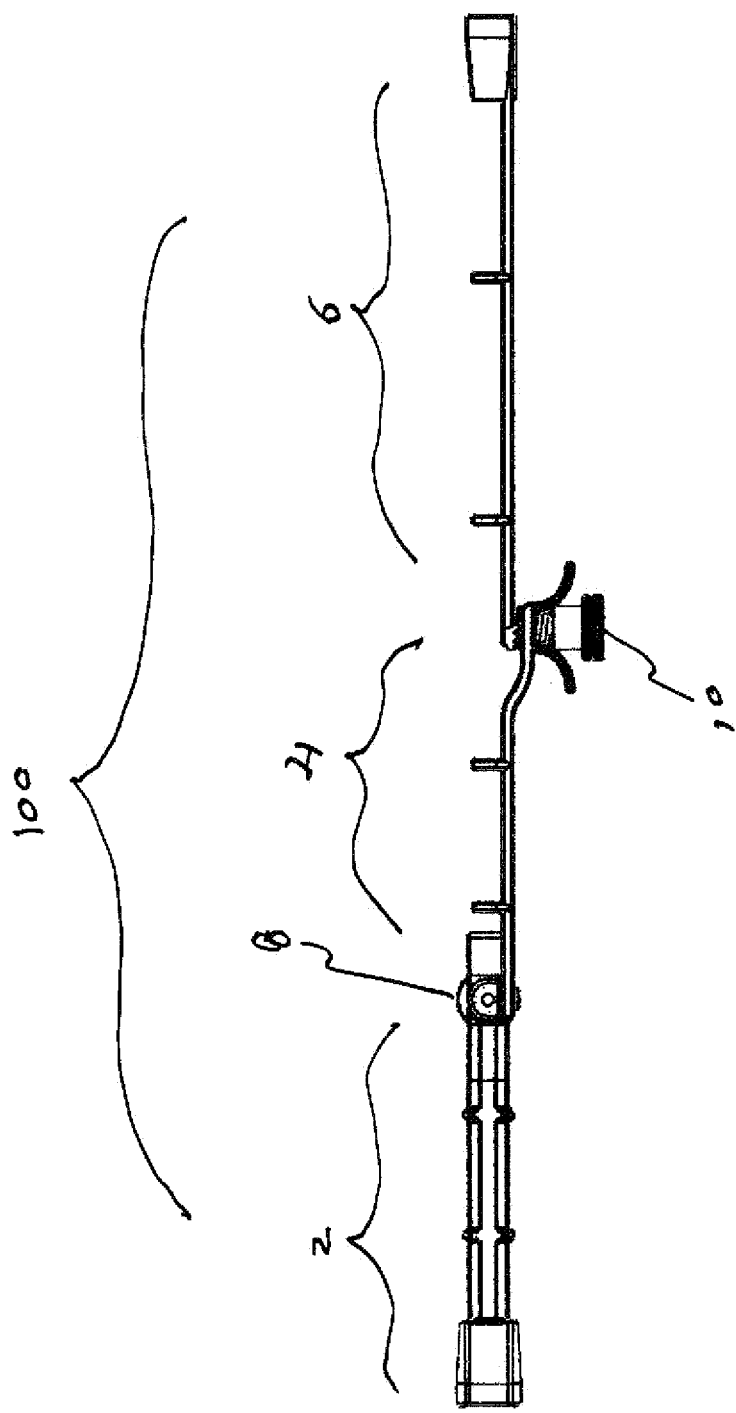
FIG. 2 is a top view of the instant embodiment.
Figure 4:
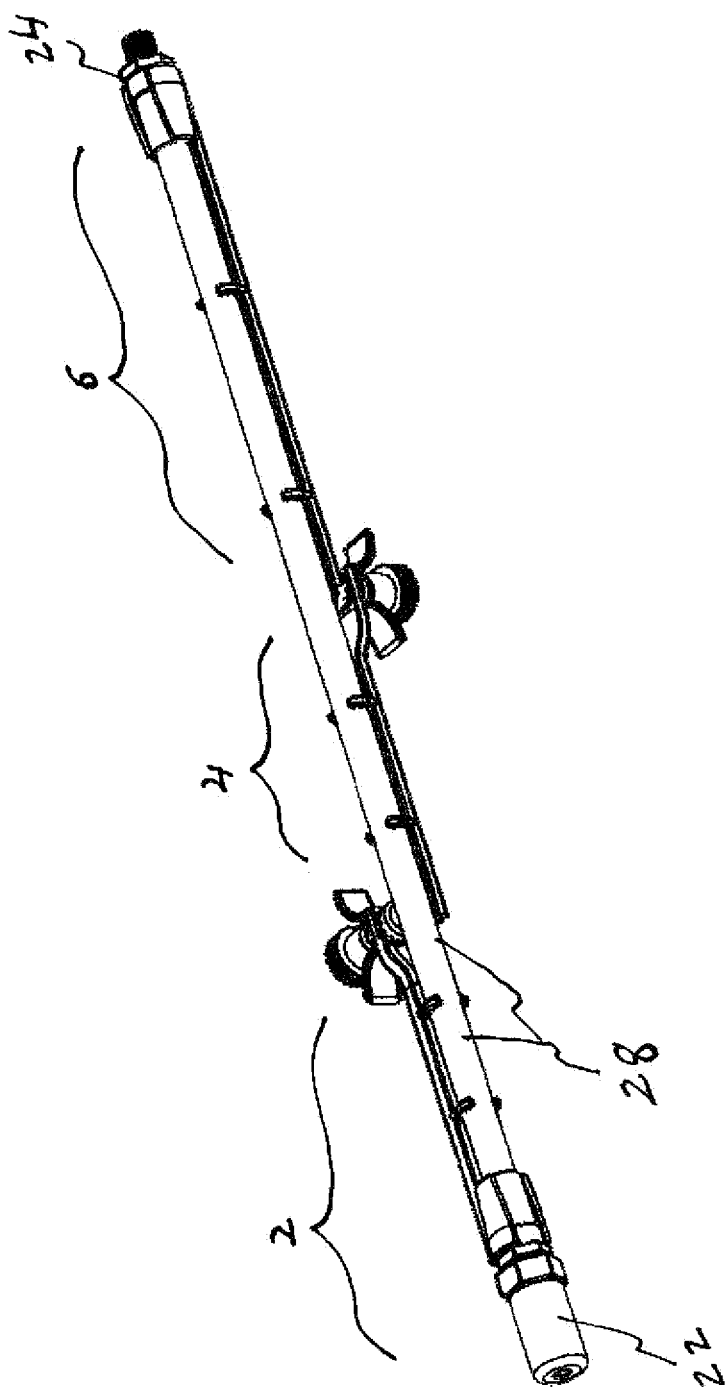
FIG. 4 is a perspective view of the instant embodiment with a flexible extension tube in place.

Referring now to FIG. 1 we see a perspective view of the invention 100. In the present embodiment three rigid elongate hose support members 2, 4, 6 are attached to each other by radial gear toothed panel assemblies 18, 20. The rigid support members comprising a grease gun extension device end member (6) and a grease gun extension device inner member (4) and a grease gun extension device discharge end member (2). Knobs 8, 10 can be pulled by the user with the assistance of fingers anchored to the underside of side finger pull flanges 12, 14 to separate the teeth of the radial gear toothed panel assemblies 18, 20 to allow the support members 2, 4, 6 to pivot and be set at a different angle. C-shaped tube retainers 16 help hold a flexible grease gun tube 28 as shown in FIG. 4. Geared panel assemblies 18, 20 are placed at a ninety degree angle to each other allowing tube holding member 2 to be rotated on one axis, and tube holding member 6 to be rotated at an axis that is ninety degrees to tube holding member 2 there by allowing flexible tube 28 to be bent and fixed in place to be able to reach otherwise hard to access grease fitting locations on a piece of equipment that needs lubrication.

Figure 3:
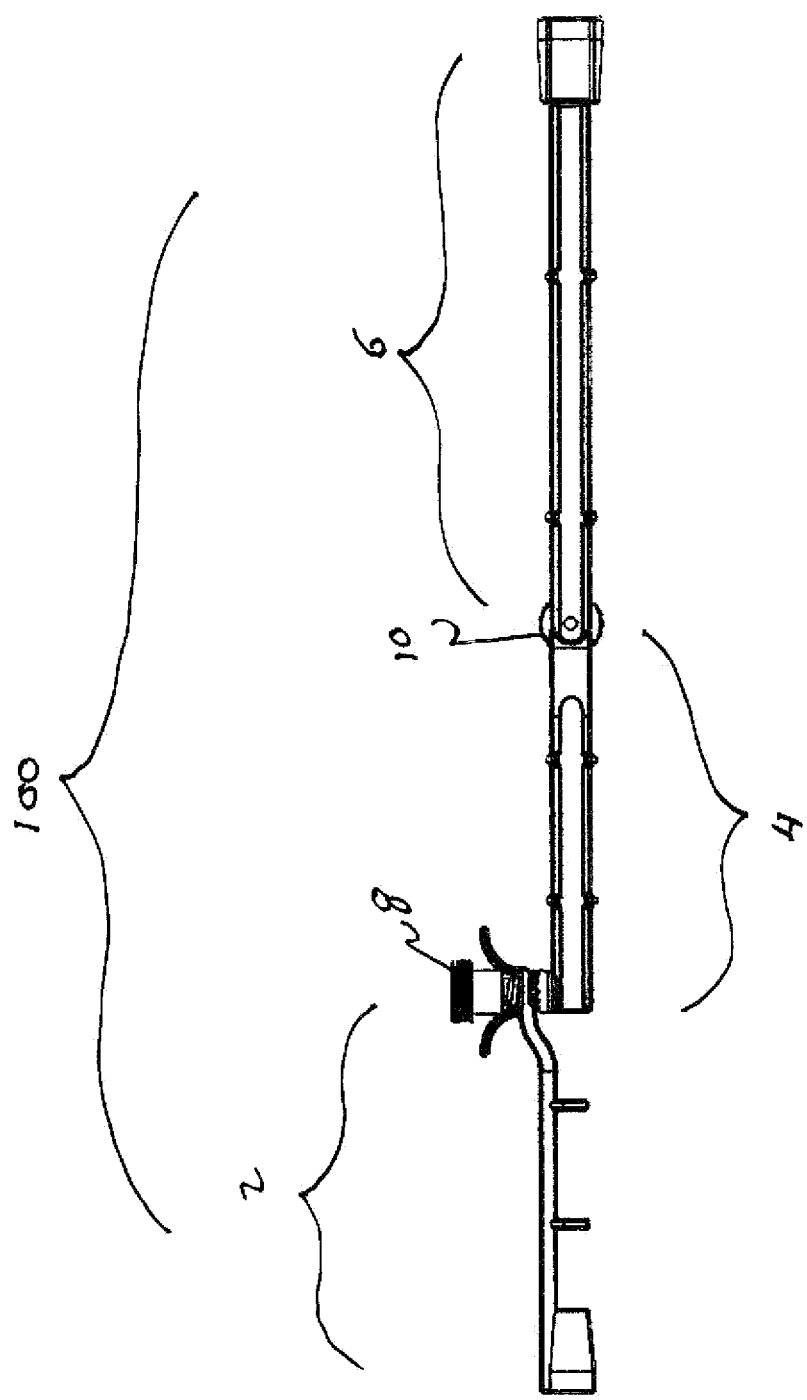
FIG. 3 is a side view of the instant embodiment.

FIG. 3 is a side view of the invention 100 clearly showing knob 8 in a ninety-degree orientation to knob 10.

FIG. 4 is a perspective view of the invention 100 with a flexible extension hose 28 in place. End 24 screws into a standard grease gun and end 22 is the exit port for injecting grease into a fitting.

Figure 5:
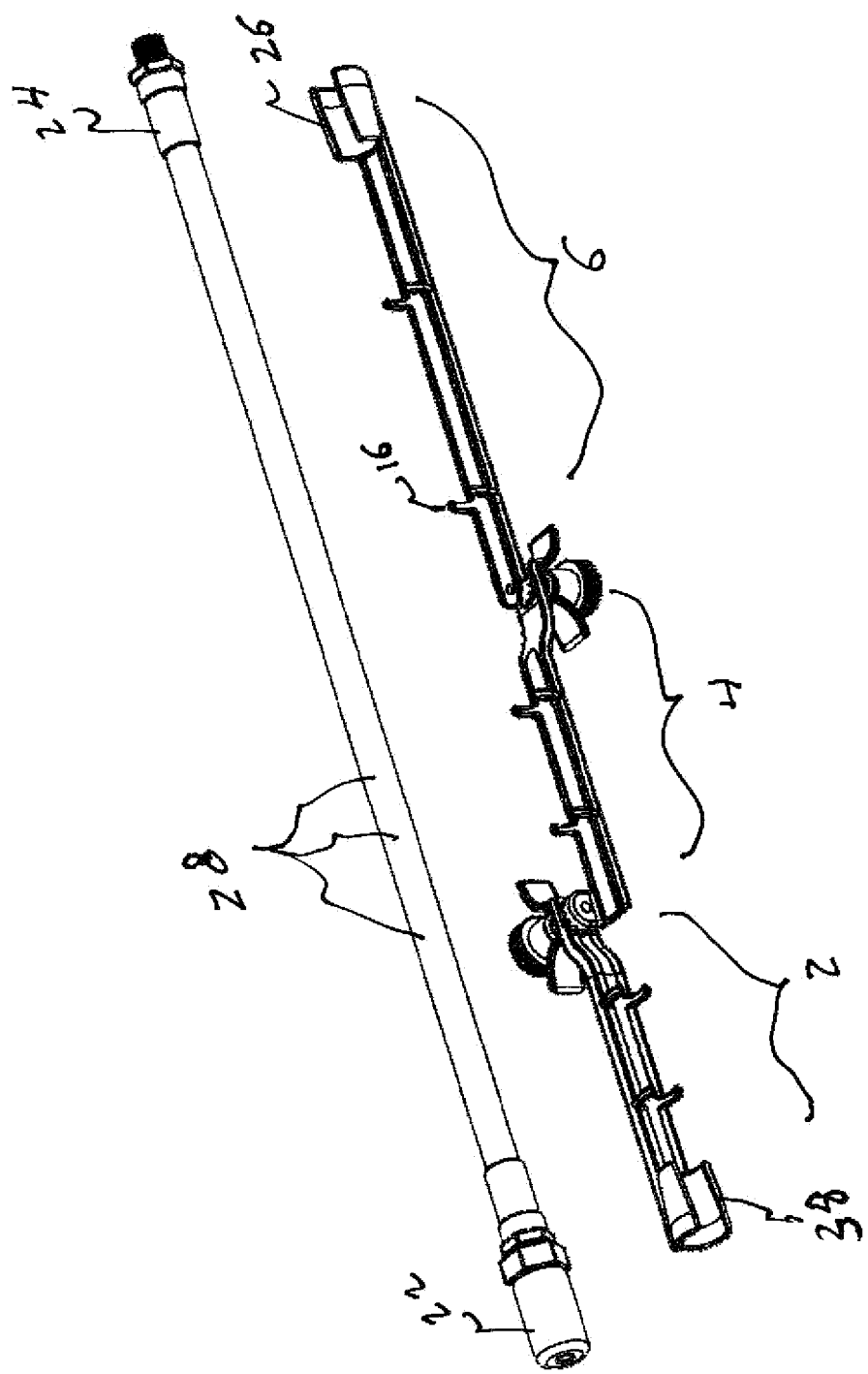
FIG. 5 is a perspective view of the instant embodiment with the flexible extension tube removed from the invention.

FIG. 5 is a perspective view of the invention 100 with flexible extension hose 28 about to be placed in the C-shaped retainers 16 on elongate members 2, 4, 6 as well as end cradles 26, 34.

Figure 6:
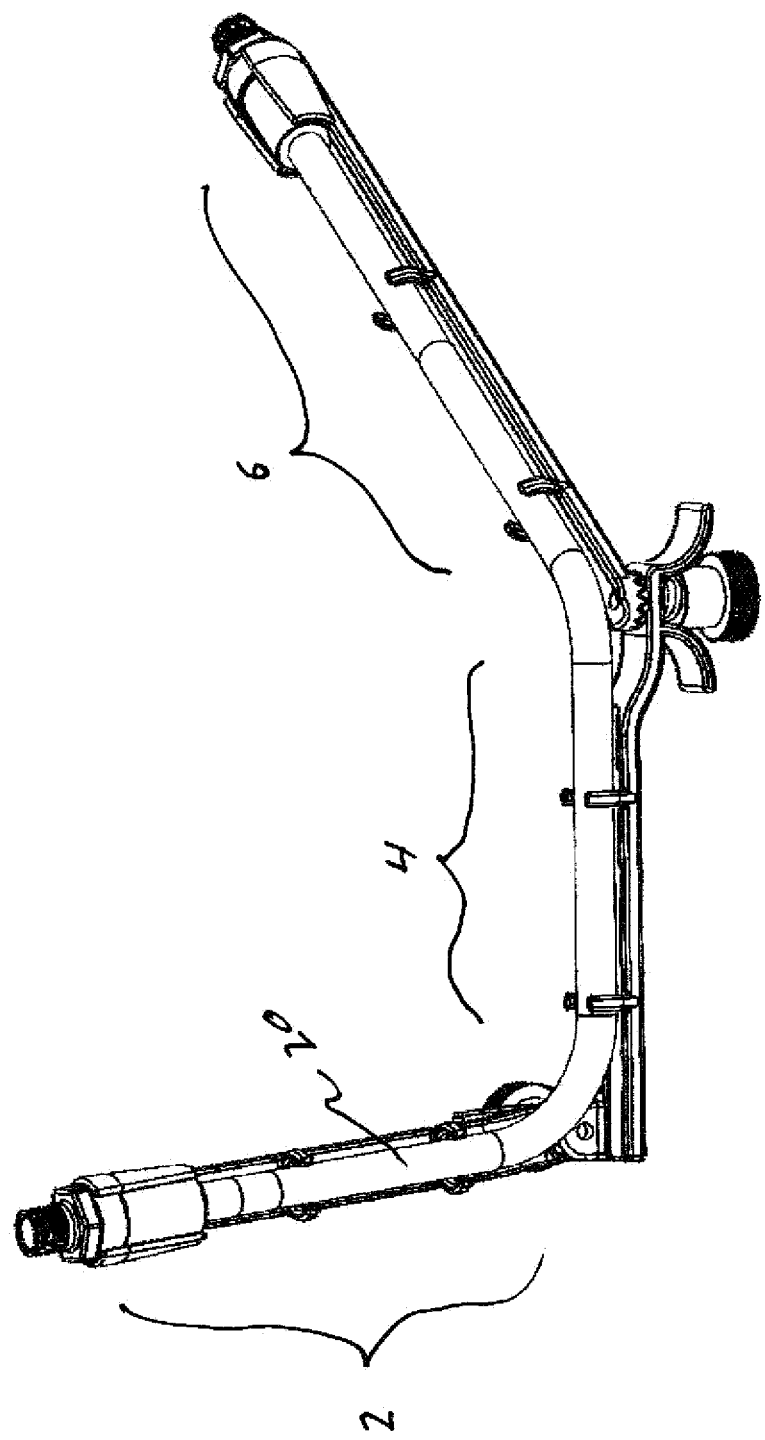
FIG. 6 is a perspective view of the instant embodiment with the flexible extension tube being held at two fixed angles.

FIG. 6 is a perspective view of the invention 100 with elongate member 2 bent on one axis and elongate member 6 bent on an axis that is ninety degrees to elongate member 2.

Figure 7:
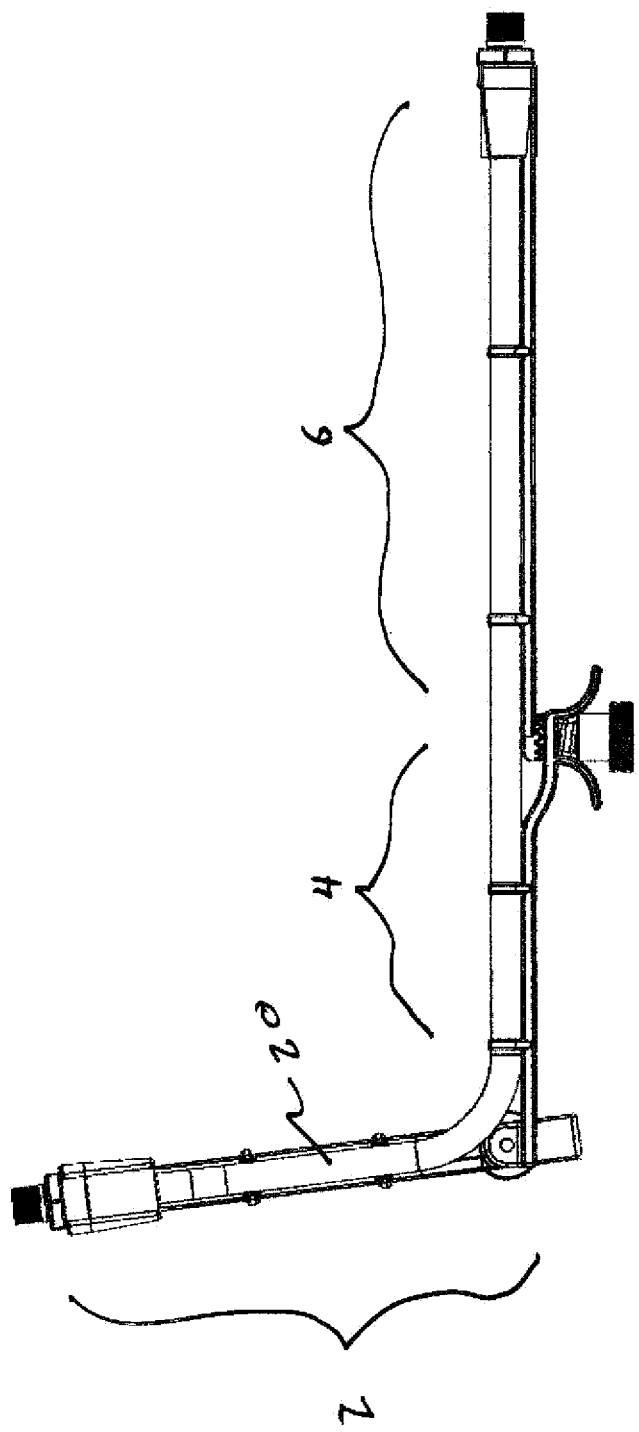
FIG. 7 is a perspective view of the instant embodiment with the flexible extension tube being held one fixed angle.

FIG. 7 is a perspective view of the invention 100 with elongate member 2 bent and elongate member 6 left unbent.

Figure 8:
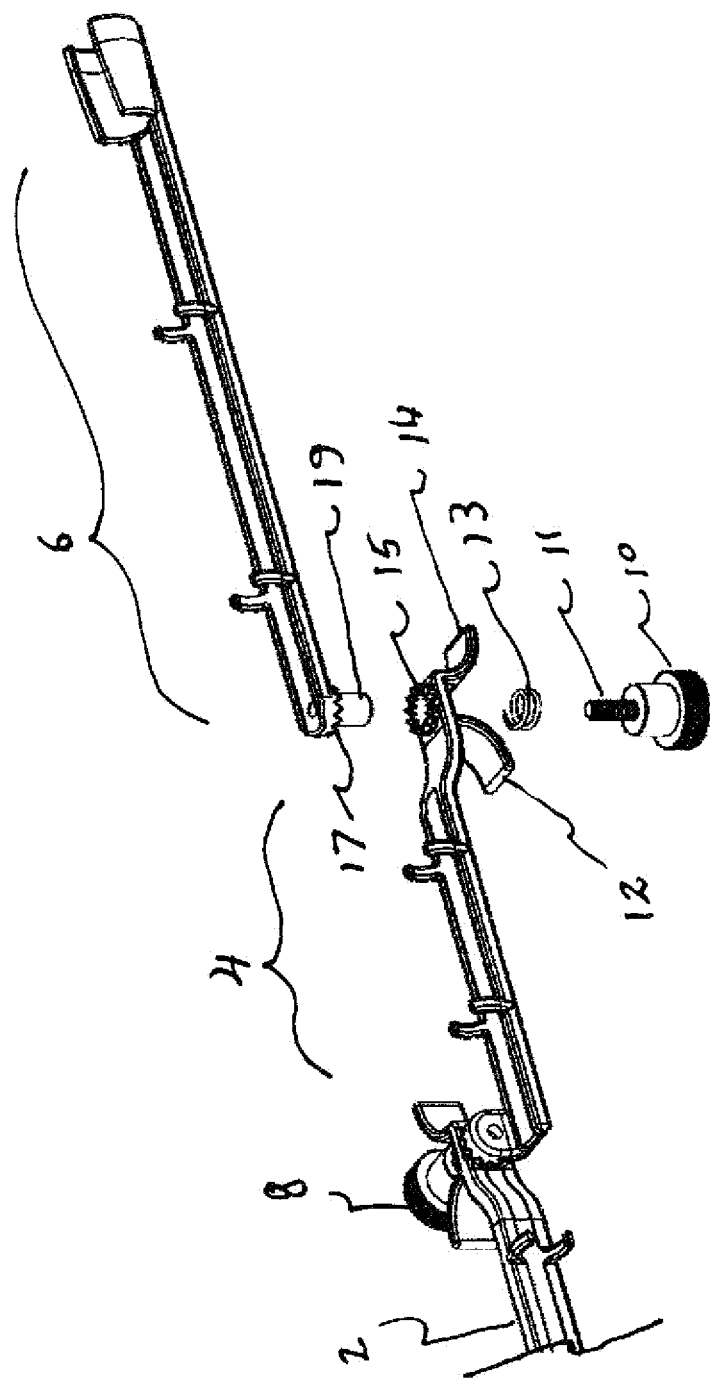
FIG. 8 is an exploded view of the instant embodiment.
Figure 9:
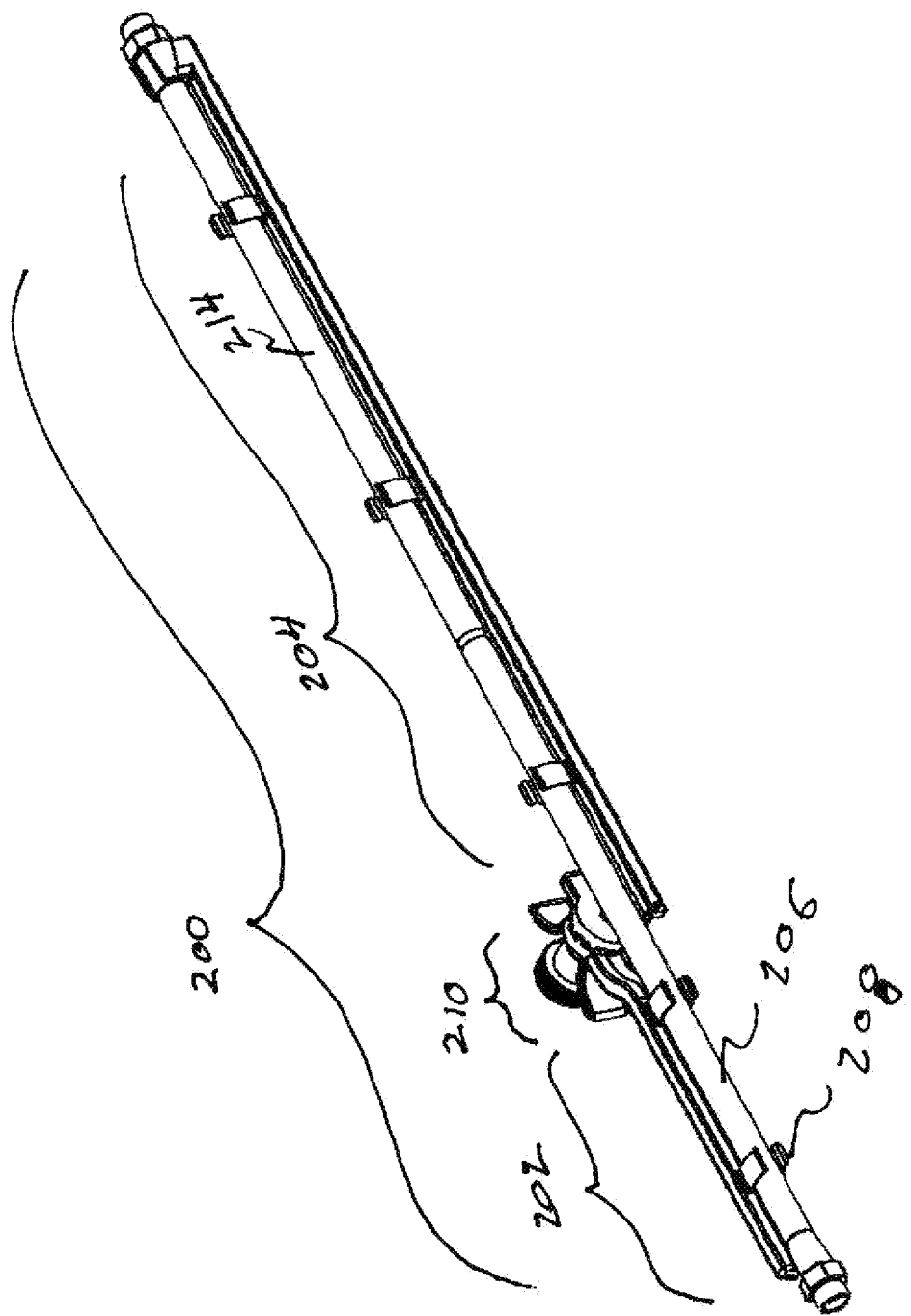
FIG. 9 is an alternate embodiment with two sections, shown in a straight line.

FIG. 8 is an exploded view of the invention 100 showing the individual pieces of the radial gear tooth plate mechanism. Knob 10 includes a threaded post 11 which penetrates compression spring 13, an aperture in gear plate 15 and threads into a socket 19 located just under radial gear plate 17. When a person pushes on knob 10 with the help of finger holding wings 12, 13, gear plate 15 is separated from gear plate 17 allowing the user to adjust the angle of elongate section 4 with respect to elongate section 6. Once the user releases knob 10, the radial plates 15, 17 reengage to create a fixed joint that holds the two elongate members 4, 6 at the desired angle with respect to each other.

Figure 10:
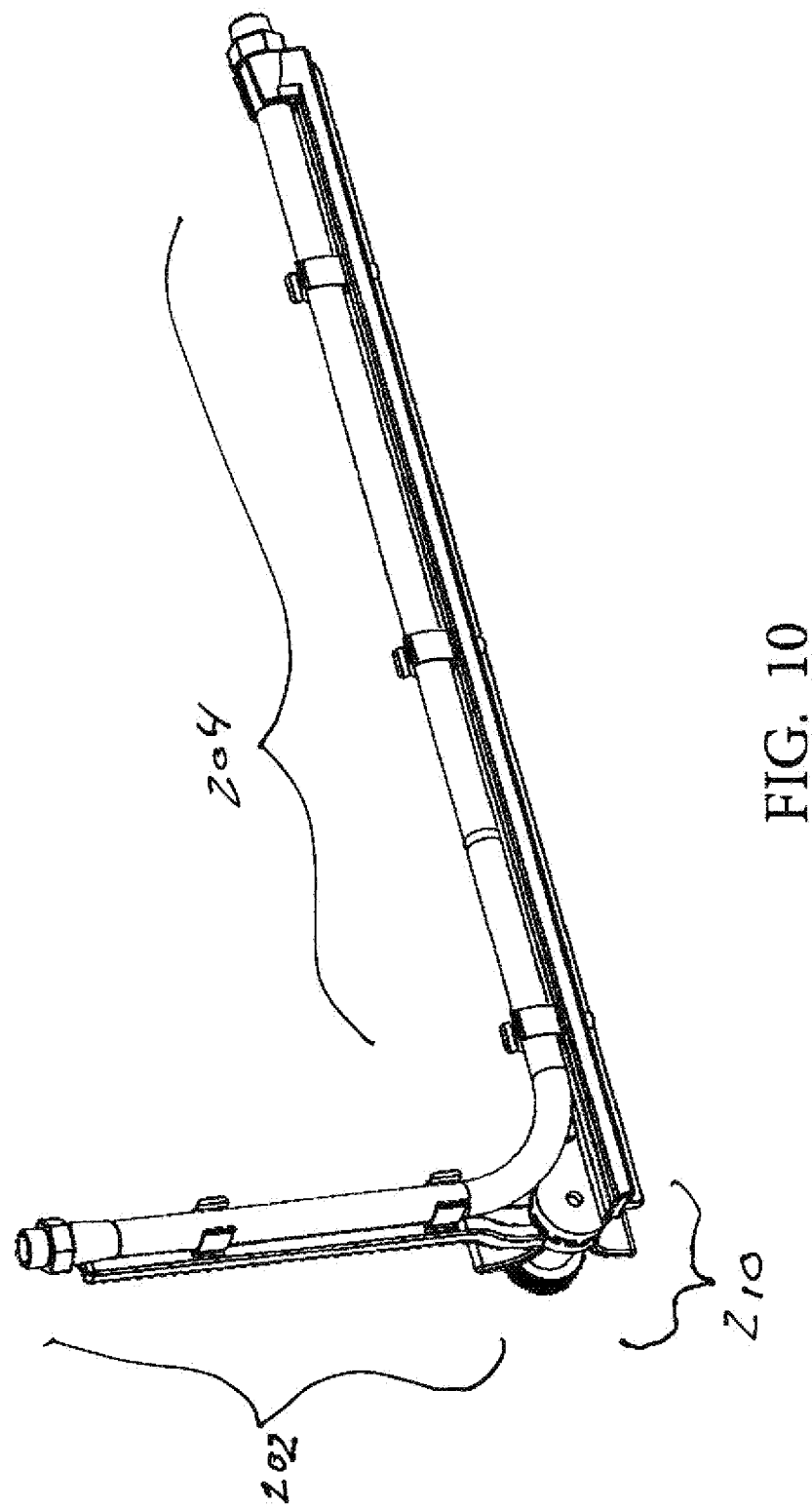
FIG. 10 is the alternate embodiment in a bent form.
Figure 11:
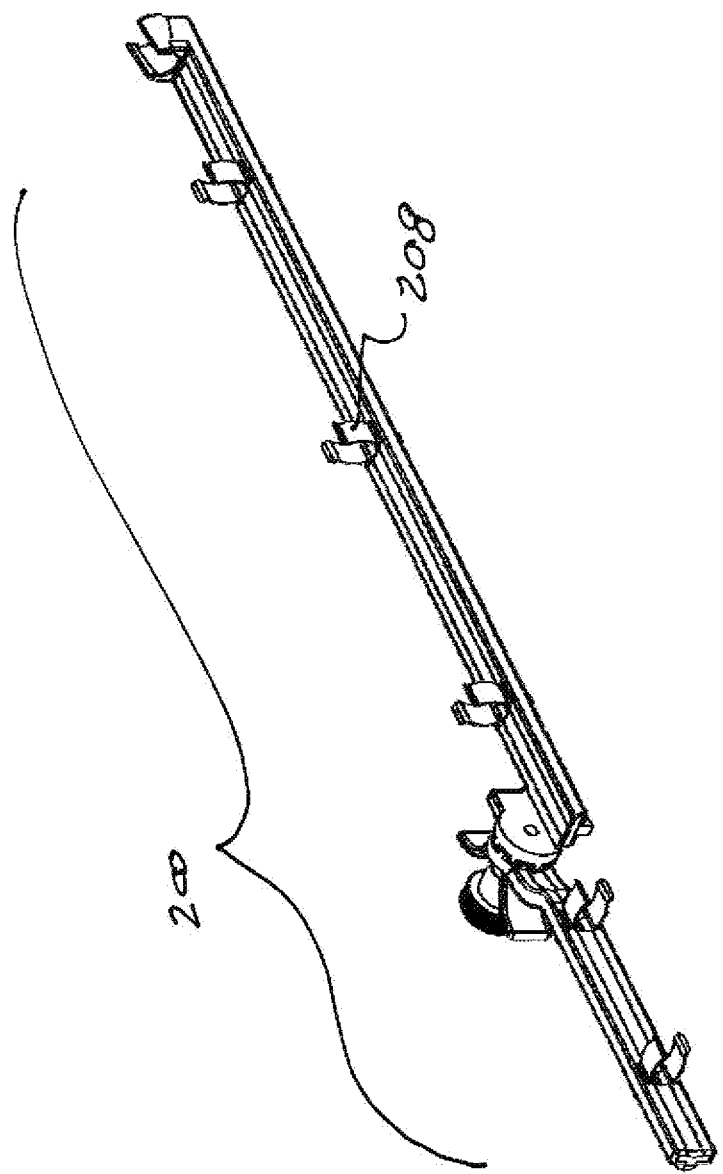
FIG. 11 is the alternate embodiment without the hose.
Figure 12:
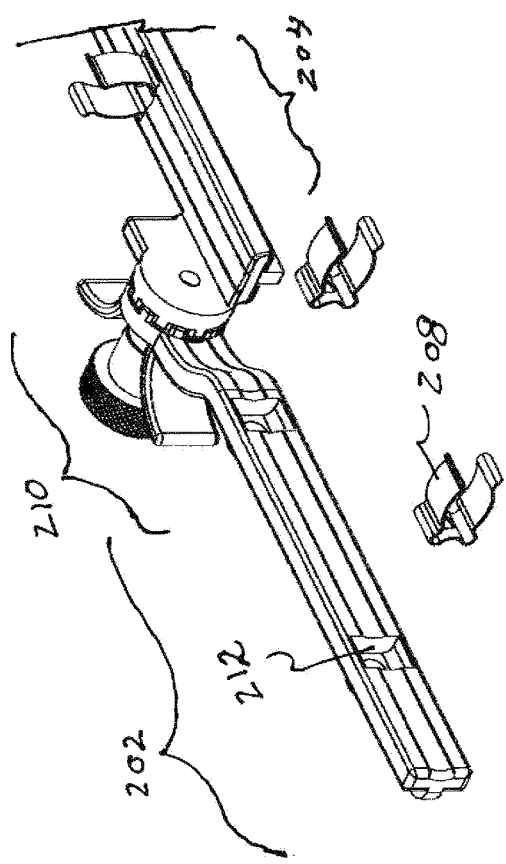
FIG. 12 is a partial exploded view of the alternate embodiment.

FIGS. 9, 10, 11 and 12 are perspective views of an alternate embodiment 200 of the invention which has two sections 202, 204 connected by rotating joint 210 which works the same way as in the first embodiment 100. The flexible hose 214 is held by metal spring clips 208. The assembly 200 can be bent and set to a variety of angles, as shown in FIG. 10 and described in detail above when discussing the first embodiment 100. FIG. 11 shows the alternate embodiment 200 without hose 208. FIG. 12 is a partial exploded view showing how clips 208 fit into sockets 212 and are held to the members 202, 204 via threaded screw and nut, not shown.

Figure 13:
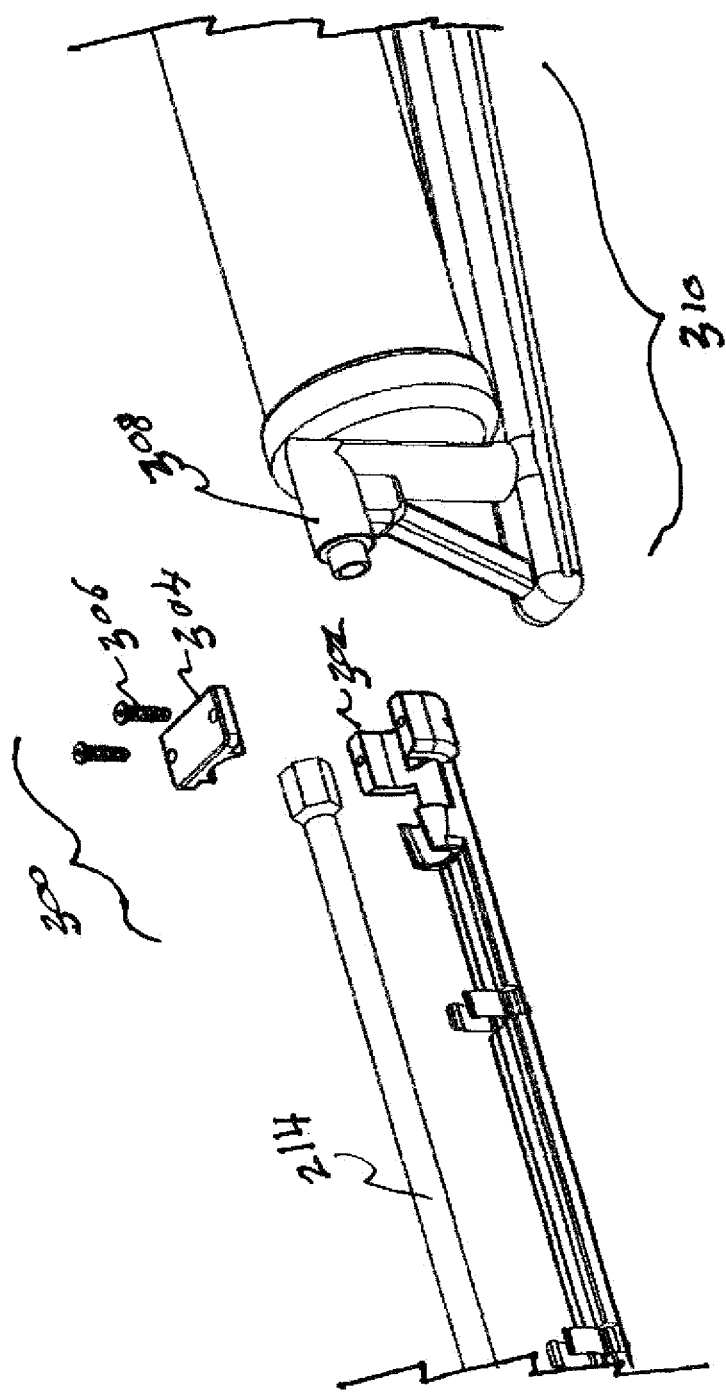
FIG. 13 is a partial exploded view of an alternate embodiment 300.

FIG. 13 is a partial exploded view of an alternate embodiment 300 that shows the addition of a clamp assembly 300 integrally built into the rigid section closes to the proximal end of grease pump 310. Clamp 302 is attached with screws 306 onto grease gun tip 308 vial top plate 304.

Figure 14:
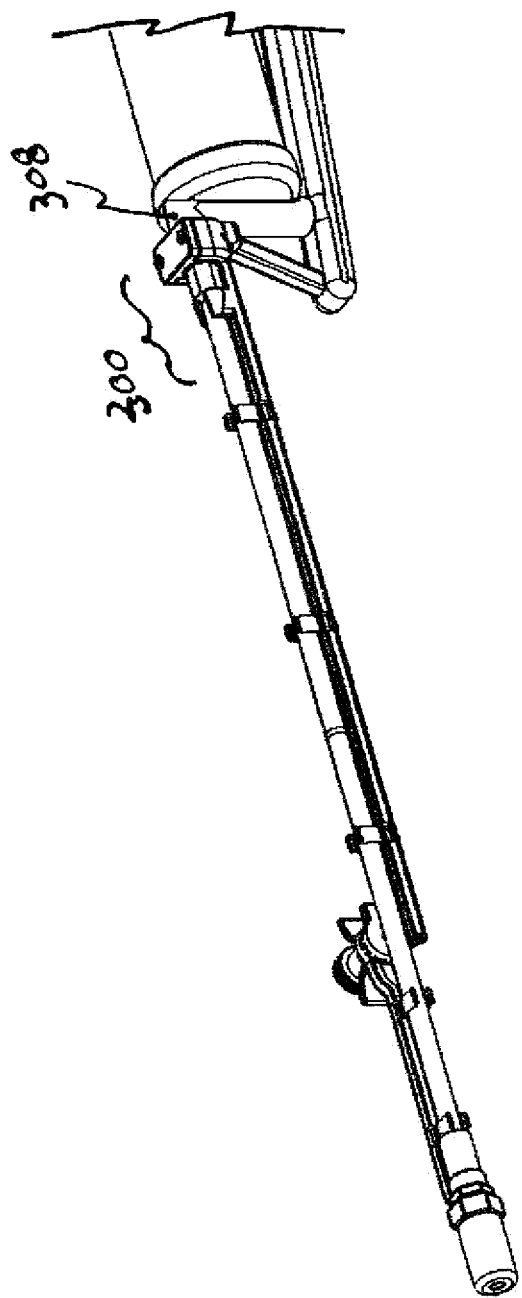
FIG. 14 is a partial view showing the clamp assembly.

FIG. 14 is a partial view showing the clamp assembly 300 in place on the grease gun tip 308.

It should be noted that the elongate tube supporting members can be a variety of lengths, and the number of tube supporting members can also vary.

In the above described and illustrated way, a person using a grease gun can set a flexible grease extension hose in a bent yet rigid condition to allow the user to attach the tip of the flexible hose to a grease fitting and to put moderate pressure on the hose to insure that the tip of the hose remains in intimate contact with the grease fitting thereby reducing the chance of an unwanted excess grease escaping from the tube tip during a lubrication event.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. An articulated grease gun extension device comprising a series of rotatably joined rigid elongate supporting members capable of accommodating a flexible grease gun extension tube, the series of members comprising a grease gun extension device end member, at least one grease gun extension device inner member, and a grease gun extension device discharge end member:
  a plurality of gear panel assemblies, each gear panel assembly comprising a fixedly attached gear plate comprising radially perpendicularly disposed gear teeth;
  a plurality of spring biased locking knobs;
  the grease gun extension device end member comprising a first end capable of cradling a grease gun connection end of a flexible grease gun extension tube, and a second end comprising the gear plate;
  the grease gun extension device inner member, comprising a first end comprising a gear plate and a second end comprising a gear plate the first end further comprising finger pull flanges;
  the grease gun extension device discharge end member comprising a first end comprising a gear plate and a second end capable of cradling a discharge end of the flexible grease gun extension tube, the first end further comprising finger pull flanges;
  each of the grease gun extension device rigid elongate supporting members further comprising a first surface and a second surface being on an opposite side of the rigid elongate member from the first surface, wherein each gear panel assembly of the plurality of the gear panels is disposed on the first surface, and wherein each spring biased locking knob of the plurality of the spring biased knobs and the finger pull flanges are disposed on the second surface;
  the grease gun extension device rigid elongate supporting members comprising C-shaped retainers capable of retaining the flexible grease gun extension tube;
  wherein the gear plate of the first end of each rigid elongate member supporting member being capable of engaging the gear plate of the second end of adjoining rigid elongate member supporting member;
  a first of the plurality of spring biased knobs attached to the first end of the inner member comprising a central post that penetrates the first end gear plate of the inner member and joins it with the second end gear panel of the grease gun end member, and acts as a pivot point;
  a second of the plurality of spring biased knobs located on the first end of the grease discharge end member between the finger pull flanges comprises a central post that penetrates the first end gear plate of the grease discharge end member and joins it with a second end gear plate of the inner member, and acts as a pivot point;

the springs of the spring biased knobs being compression springs and being trapped between the support member, opposite side of the gear plate and the spring biased locking knob;

the finger pull flanges allowing a user to dislodge the first gear plate from the second gear plate and to adjust the angle of one rigid elongate member supporting member with an adjacent rigid elongate supporting member;

wherein by locking and unlocking the gear plates, a user can set a flexible grease gun extension tube in a fixed and selectively bent position; and each inner supporting member being able to be adjusted angularly with respect to adjacent supporting member, allowing the flexible grease gun extension tube to be bent and then fixed at any desirable angle.

2. A grease gun extension device as claimed in claim 1, wherein the C-shaped retainers are formed by C-shaped spring clips that are each fastened to the rigid elongate member supporting members via a screw and nut.

3. A grease gun extension device as claimed in claim 1 wherein the rigid elongate tube supporting member that is closest to the proximal end of the grease gun includes an integral clamp that attaches to the tip of the proximal end of the grease gun.

\* \* \* \* \*